(12) United States Patent
Lindner et al.

(10) Patent No.: US 9,103,499 B2
(45) Date of Patent: Aug. 11, 2015

(54) GAS STORAGE TANK COMPRISING A LIQUID SEALANT

(75) Inventors: Markus Lindner, Mainz (DE); Dimitri A. Podorashi, Weiterstadt (DE); Axel Junge, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 12/959,907

(22) Filed: Dec. 3, 2010

(65) Prior Publication Data

US 2012/0138616 A1 Jun. 7, 2012

(51) Int. Cl.
*F17C 1/06* (2006.01)
*F17C 1/16* (2006.01)

(52) U.S. Cl.
CPC ... *F17C 1/16* (2013.01); *F17C 1/06* (2013.01); *F17C 2201/0109* (2013.01); *F17C 2201/0128* (2013.01); *F17C 2201/056* (2013.01); *F17C 2203/0604* (2013.01); *F17C 2203/066* (2013.01); *F17C 2203/0619* (2013.01); *F17C 2203/0621* (2013.01); *F17C 2203/0646* (2013.01); *F17C 2203/0648* (2013.01); *F17C 2203/0663* (2013.01); *F17C 2203/0675* (2013.01); *F17C 2203/0682* (2013.01); *F17C 2205/0196* (2013.01); *F17C 2205/0305* (2013.01); *F17C 2205/0338* (2013.01); *F17C 2205/0394* (2013.01); *F17C 2209/219* (2013.01); *F17C 2209/2118* (2013.01); *F17C 2209/2127* (2013.01); *F17C 2209/2145* (2013.01); *F17C 2209/2154* (2013.01); *F17C 2209/221* (2013.01); *F17C 2209/234* (2013.01); *F17C 2221/012* (2013.01); *F17C 2221/018* (2013.01);

(Continued)

(58) Field of Classification Search
CPC .... F17C 1/16; F17C 13/04; F17C 2201/0104; F17C 2201/054; F17C 2203/0604; F17C 2203/0619; F17C 2203/621; F17C 2203/624; F17C 2203/066; F17C 2203/0663; F17C 2203/0673; F17C 2205/0305; F17C 2209/2163; F17C 2209/228; F17C 2221/011; F17C 2221/012; F17C 2221/033; F17C 2221/035; F17C 2223/0123; F17C 2223/0153; F17C 2223/0161; F17C 2223/033; F17C 2223/036; F17C 2260/011; F17C 2270/0197; C09J 123/16; C09J 151/04
USPC .................................. 220/581, 586, 588–590
See application file for complete search history.

(56) References Cited

U.S. PATENT DOCUMENTS 3,757,828 A * 9/1973 Frauenglass et al. ......... 138/145
3,815,773 A * 6/1974 Duvall et al. ................. 220/590

(Continued)

FOREIGN PATENT DOCUMENTS

CN 1074990 A 8/1993
WO 2009112233 A1 9/2009

OTHER PUBLICATIONS

Chinese Office Action dated Oct. 23, 2013; Application No. 201110461943.0; Applicant: GM Global Technology Operations LLC; 9 pages.

*Primary Examiner* — Bryon Gehman
*Assistant Examiner* — Brijesh V. Patel
(74) *Attorney, Agent, or Firm* — BrooksGroup

(57) ABSTRACT

One exemplary embodiment includes a gas storage tank comprising a structural outer layer, an internal liner layer, an annular boss, and a liquid sealant disposed between the overlapped section of the liner layer and the boss to provide a gas-tight seal.

12 Claims, 1 Drawing Sheet

(52) U.S. Cl.
CPC ... *F17C2221/033* (2013.01); *F17C 2223/0123* (2013.01); *F17C 2223/036* (2013.01); *F17C 2250/043* (2013.01); *F17C 2250/0439* (2013.01); *F17C 2250/0491* (2013.01); *F17C 2260/011* (2013.01); *F17C 2260/036* (2013.01); *F17C 2270/0168* (2013.01); *F17C 2270/0184* (2013.01); *Y02E 60/321* (2013.01); *Y10T 29/49826* (2015.01)

(56) References Cited

U.S. PATENT DOCUMENTS

| | | | | |
|---|---|---|---|---|
| 3,843,010 | A | * | 10/1974 | Morse et al. .................. 220/590 |
| 4,341,631 | A | * | 7/1982 | Hargitay .................... 210/323.2 |
| 4,927,038 | A | * | 5/1990 | Roebuck ....................... 220/590 |
| 5,253,778 | A | * | 10/1993 | Sirosh ........................... 220/590 |
| 5,287,988 | A | * | 2/1994 | Murray .......................... 220/589 |
| 5,346,939 | A | * | 9/1994 | Moren et al. .................. 524/176 |
| 5,429,845 | A | * | 7/1995 | Newhouse et al. .......... 428/34.1 |
| 5,518,141 | A | * | 5/1996 | Newhouse et al. ........... 220/586 |
| 5,551,590 | A | * | 9/1996 | Mazur et al. ................ 220/23.83 |
| 6,227,402 | B1 | * | 5/2001 | Shimojima et al. ........... 220/581 |
| 6,232,431 | B1 | * | 5/2001 | Hosoki ......................... 528/196 |
| 7,736,566 | B2 | | 6/2010 | Pechtold et al. |
| 8,231,028 | B2 | | 7/2012 | Matsuoka et al. |
| 2004/0164499 | A1 | * | 8/2004 | Murakami et al. ............ 277/628 |
| 2007/0012551 | A1 | * | 1/2007 | Rohwer et al. ............. 200/61.22 |
| 2007/0029701 | A1 | * | 2/2007 | Pechtold et al. .............. 264/255 |
| 2008/0264539 | A1 | * | 10/2008 | Merino-Lopez et al. .. 152/341.1 |
| 2010/0032612 | A1 | * | 2/2010 | Yanagi et al. ................... 252/72 |
| 2010/0163565 | A1 | * | 7/2010 | Matsuoka et al. ............. 220/581 |
| 2011/0061782 | A1 | * | 3/2011 | Merino Lopez et al. ..... 152/503 |
| 2011/0220661 | A1 | * | 9/2011 | Strack ........................... 220/586 |

* cited by examiner

GAS STORAGE TANK COMPRISING A LIQUID SEALANT

TECHNICAL FIELD

The technical field generally relates to a gas storage tank including a liquid sealant.

BACKGROUND

Various fuel gases such as natural gas, hydrogen, acetylene, and methane, can be stored in a pressurized gas storage tank. To increase storage density and to reduce total system weight, high working gas pressure and light weight tank design are required. For pressurized hydrogen gas storage, special attention must be paid to tank design and material selection due to high permeability of hydrogen through most materials and well-know hydrogen embrittlement of many common metals. Furthermore, the ignition potential of hydrogen is much greater than methane. Theoretically, hydrogen permeation is approximately 34 times greater than that of methane. Permeation and leakage are recognized as major issues. The pressure in a compressed hydrogen fuel tank for vehicle fuel cells can be as high as 700 bar (~70 MegaPascal). The tank connector components, such as boss-liner interface connector and O-rings, must be carefully engineered and assembled in order to prevent leaks. Any minor defects or mis-assembly of those connectors can result in significant gas leakage.

The stored hydrogen gas is typically discharged from the tank through a pipe. At least one pressure regulator is provided that reduces the pressure of the hydrogen within the tank to a suitable pressure for feeding into a fuel cell system. As the hydrogen is discharged from the compressed tank, the pressure of the stored hydrogen in the tank will decrease and the tank temperature will fall. If the flow rate of the hydrogen discharged from the tank is high enough and/or the temperature of the environment is low enough, the temperature in the tank can reach as low as $-80°$ C. On the other hand, when the tank is being charged with hydrogen, the temperature of the hydrogen in the tank can rise up to $85°$ C. due to the compression of the hydrogen inside the tank. Such a wide temperature swing between $-80°$ C. and $85°$ C. in repeated charging/discharging cycles puts significant mechanical stresses on tank connector components, including O-rings and other sealing adhesives. Under such operating conditions, the o-rings and sealing adhesives may deteriorate and possibly be damaged, resulting in hydrogen leakage. Therefore, there is a need for improved sealing material and tank design that are more resistant to the cyclic stresses and offer desirable self-sealing characteristic.

SUMMARY OF EXEMPLARY EMBODIMENTS OF THE INVENTION

One exemplary embodiment includes a gas storage tank comprising a structural outer layer, an internal liner layer, an annular boss having a flange section extended inside the tank and partially overlapped with a section of the liner layer, and a liquid sealant disposed between the overlapped section of the liner layer and the boss flange section to provide a gas-tight seal.

Another exemplary embodiment includes a method of manufacturing a gas tank comprising: providing a liner material having low permeability to hydrogen gas and an annular boss resistant to hydrogen embrittlement having at least one flange section; forming a gas tight bladder fitted with the annular boss using the liner material such that a flange section of the boss overlaps with the liner material; disposing a liquid sealant between the flange section of the boss and the overlapped liner section; and forming a structural outer layer over the bladder.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

The gas storage tank may be constructed in a spherical shape or a cylindrical shape with generally semi-spherical ends (domes) for use in high pressure applications although other tank geometries are also possible. The tank may comprise an internal bladder made of a gas tight internal liner layer protected by a structural outer layer. A boss may be used to reliably join the internal liner with the outer structural layer at pressurization ports in the tank shell to prevent gas leak between the liner and the shell. There may be more than one boss in a gas storage tank. There is generally a bore section within the boss to provide secure and reliable gas communication with a gas charging source, gas consumption device, and a pressure/temperature sensor.

Figure 1:
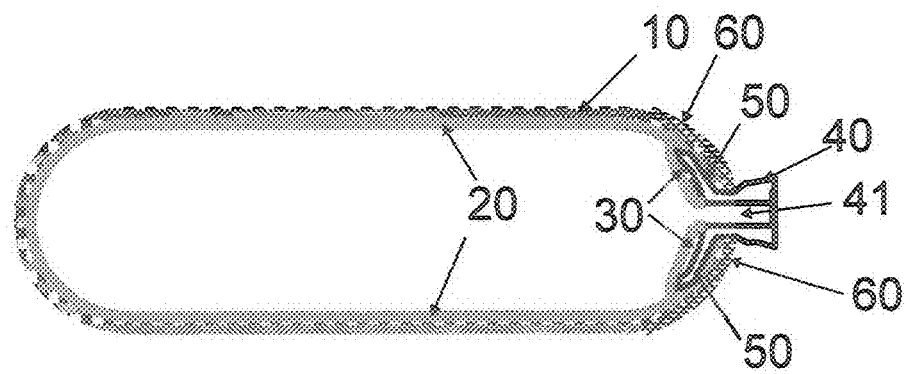
FIG. 1 is a cross-sectional view of a gas storage tank according to one embodiment of the invention.

FIG. 1 is a cross-section view of a gas storage tank according to one embodiment of the invention. The gas tank comprises an internal bladder made from a liner layer 20, an outer structure layer 10, and a boss 40 joining the liner 20 with the outer structural layer 10 at the pressurization port at one end of the cylindrical tank. The boss 40 include a flange section 50 that overlaps with a section of the liner layer and a section of the outer structure layer. A liquid sealant 30 is disposed between the flange section 50 of the boss and the liner layer to provide effective leak proof seal. The boss includes an annular bore section 41 extended through the boss and configured to accept an in-tank valve block (not shown in the drawing). The in-tank valve block may include pressure regulator and temperature/pressure sensors. To protect the highly stressed semi-spherical ends section of the cylindrical tank, an energy absorbing foam or rubber pad 60 may be placed over one or both end sections of the tank.

Figure 2:
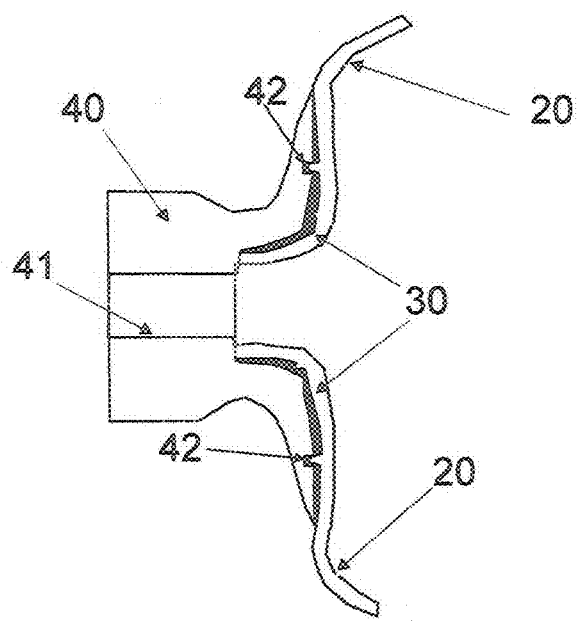
FIG. 2 is a cross-sectional view of the boss/liner interface section of a gas storage tank according to one embodiment of the invention.

FIG. 2 is a cross-sectional view of the boss/liner interface section of a gas storage tank according to one embodiment of the invention. The boss 40 may include a locking groove 42 provided on one or both of two axially opposite surfaces of the flange section. An annular locking groove (not shown in the drawing) may be provided on the outer surface of the flange section facing outwardly toward the outer structural layer.

The locking groove 42 on the inner surface of the flange section facing inwardly maintains positive interlocking engagement with the liner layer 20. Each groove receives a complementary part on the corresponding sections of the internal liner layer. A liquid sealant 30 may be disposed between the flange section of the boss and the liner layer to provide effective shear resistance seal. The liquid sealant is adapted to flow under the gas pressure inside the tank to fill and seal any gaps between the boss flange section and liner layer.

A thin shear accommodating layer may be interposed between the outer structural layer 10 and the liner 20 to prevent shear stress induced damage to the outer shell or liner during pressurization of the tank. The shear accommodating layer may be made of any plastic, elastomeric, or other non-metallic material, and may be manufactured by a molding process or cut from sheet stock.

The internal liner layer may be made of a material having low hydrogen gas permeability and low Young's modulus. The liner may have a Young's modulus of about 0.2-2 giga-Pascal and a thickness about 0.1 mm to about 10 mm. The low modulus allows it to expand during pressurization, which allows transfer of all loads to the structural outer layer of the tank shell. The liner may be made of, for example, polyolefin, crosslinked polyolefin, polyamide (such Nylon 12), polyimide, fluoropolymers (such as Aclar and Kapton), dicyclopentadiene polymer, aluminum metal or aluminum alloys. A metalized organic polymer film are also conceived. A high density polyethylene, for example, may be used to form the liner layer. The high density polyethylene may be selected from those meeting the requirement of ASTM 1248 Type III, Grade P34, Class C, Cat. 5 products. The high density polyethylene has a high level of environmental stress cracking resistance and high strength. The internal liner layer can be manufactured by compression molding, blow molding, injection molding, rotomolding or any other generally known techniques. The internal liner provides a gas permeation barrier, structural interfaces (with the boss), and a stable mandrel for the filament winding process that may be used to form the structural outer layer.

The dome sections for the internal bladder may be manufactured using an injection molding process or rotomolding process. The cylindrical portion of the bladder may be manufactured via a pipe extrusion process to produce a tightly controlled diameter and wall thickness. To produce a complete bladder, the dome sections are welded to a section of cylindrical portion. During welding, a heated platen is positioned between the dome and cylindrical portions for a controlled period of time and pressure. At the conclusion of a preset heatup time, the platen is removed and the surfaces are fused together via pressure, for a controlled period of time. A inner thin coating on the plastic liner may be added wherein the inner thin coating is selected to provide a barrier against hydrogen transmission.

The boss 40 may comprise a metal or metal alloy of aluminum, steel, nickel, or titanium, although it is understood that other metal and non-metal materials, such as composite materials, are suitable. It is noted that the selected boss materials should exhibit sufficient hydrogen embrittlement resistance. Hydrogen embrittlement is a problem for materials that develop a "homogeneous crystalline lattice" for strength. The effects of hydrogen on the material properties of a crystalline material are believed to be based on the interactions of the solute hydrogen (molecular or atomic) or hydrogen based chemical products at the grain boundaries of the molecular lattice. The hydrogen and/or hydrogen products affect the dislocation energies at the grain boundaries (micro level) of the materials. The material used for the metal end bosses, for example, may include 6061T6 Aluminum or other materials having similar properties as 6061T6 aluminum as extruded, rolled, drawn, or cold finished shapes.

An interface member and/or a liquid sealant layer is disposed on the boss flange section to provide a site for attaching the liner. The interface layer may be disposed on the inner surface of the flange section and may optionally be disposed on the outer surface of the flange section as well. The interface member may be made of injection molded HDPE (high density polyethylene) or other elastomeric materials which, when solidified, shrinks into conformity with the boss and is thereby securely molded or otherwise welded to the boss. The liquid sealant may be applied to the boss surface by spraying, brushing, injection, extrusion, dipping, spreading, or other coating processes. The liner is bonded, as by plastic molding, directly to the interface member and/or the liquid sealant. The liquid sealant may alternatively be disposed on top of the interface layer before it is joined to the liner layer. Furthermore, the liquid sealant may be disposed in any place near the boss/liner interface as long as the liquid sealant can be adapted or configured to flow to and fill in any potential gaps that may develop between the boss and the liner layer The outer structural layer 10 comprises a fiber reinforcing material in a resin matrix. The fiber may be fiberglass, aramid, carbon, graphite, or any other generally known fibrous reinforcing materials. The resin matrix used may be epoxy, polyester, vinylester, thermoplastic or any other suitable resinous materials capable of providing the fragmentation resistance required for the particular application in which the storage tank is to be used. The carbon fiber and glass fiber may include commercial grade, high strength, intermediate modulus continuous or staple carbon and E-glass fibers. The fiber surface is typically treated with an epoxy compatible sizing to improve the quality of the bond between the fiber and the epoxy matrix.

As mentioned above, the bladder comprising the internal liner layer fitted with the boss may be inflated to a low pressure and be used as a mandrel for forming the outer structural layer in a filament winding process. A molded rubber shear ply may be positioned over the boss flanges during preparation for filament winding. The purpose of this shear ply is to permit the differential growth between the liner and fiber reinforcing outer layer during pressurization and depressurization.

Filament winding of the composite laminate may be accomplished in a computer controlled multiaxis winding machine. To facilitate a high rate production, the fiberglass and/or carbon fibers are impregnated with resin during the winding process. The method of resin impregnation may include dip-squeeze, spray, extrusion or other fiber impregnation methods known to an ordinary skill in the art. The amount of impregnated resin may depend on the fiber count, tank size and other factors. The add-on weight of resin may be consistently controlled within ±2% by weight. Tensioning of the fiber is also controlled using various tension devices with relative tight tolerance. Fiber tension is typically preset and controlled within ±0.25 pounds during the wind process. The layer sequence and wind angles, as well as the resin content and fiber tension, can all be controlled by a filament winding computer program. After winding, additional resin may be applied and the fiber/resin layer is cured. The curing may be accomplished by heating the fiber/resin layer to a curing temperature until sufficient degree of cure and necessary mechanical properties are reached. Radiation cure and other curing methods may also be used depending on the resin chemistry used.

Additionally, a protective external fiberglass overwrap may be formed to encase the structural outer layer to mitigate damage from chemical or environmental attack and abrasion from handling. Between the structural outer layer and the protective overwrap, foam inserts may be placed over the tank dome sections. The area of reduced thickness in the dome regions in a filament winding process are more susceptible to damage if dropped or impacted. Foam inserts protect these regions by absorbing some energy directly (crushing), attenuating the peak force of impact by increasing its time duration (compression), and by distributing the force over a greater area. The exterior surface of the finished tank may be further protected with a paint coat. The paint (such as a polyurethane or acrylics resin based paints) provides scuff resistance, UV protection, and a high grade finish for cosmetic purposes.

The liquid sealant may be any liquid composition that is adapted or configured to flow under the internal gas pressure to the gaps at the boss/liner layer interface and seal the gaps to stop gas leaks. Various liquid sealant compositions and mixtures may be used accordingly. The liquid sealant may comprise a liquid rubber, an unvulcanized polymeric elastomer having a glass transition temperature below about 10° C. The liquid rubber used in the sealant typically has a sufficient viscosity and unvulcanized adhesion to the boss and the liner layer. The viscosity of liquid rubber may be measured by so-called Mooney viscosity. Mooney viscosity (Vr) is obtained by measuring the torque that is required to rotate a disc embedded in the rubber or a compounded sample. This procedure is defined in ASTM D1646 titled "Standard test methods for Mooney viscosity, stress relaxation and prevulcanization characteristics (Mooney viscometer)." The viscosity of the liquid rubber typically ranges from 45 to over 100, measured at 100° C. Mooney viscosity may be expressed as ML(1+4) or sometimes ML(1+8) (i.e., Mooney large rotor, with a one minute pause and four or eight minute test duration). Such viscosity range allows the liquid rubber to be able to fill the gaps between the boss and the liner layer, and to block gas leakage.

The liquid rubber may comprise various rubber compositions. The rubber composition may include saturated and unsaturated hydrocarbon polymers, silicone polymers, and fluoroelastomers. Hydrocarbon polymer rubbers may include diene rubbers and polyolefin rubbers. Examples of hydrocarbon rubbers may include, but not limited to, polyisoprene, polybutadiene (BR), styrene/isoprene/butadiene terpolymers, hydrogenated polybutadiene, styrene-butadiene copolymer (SBR), polychloroprene (neoprene), acrylonitrile-butadiene copolymer (NBR), ethylene-propylene-diene ter polymer (EPDM), ethylene-propylene copolymers, isobutylene based elastomers and their derivatives. Isobutylene-based elastomers may include butyl rubber, halogenated butyl rubber, star-branched versions of these polymers, and brominated isobutylene-co-para-methylstyrene polymer. Generally, butyl rubber contains from about one to about six percent repeating monomer units derived from isoprene and from about 94 to 99 percent repeating units derived from isobutylene by weight. The butyl rubber typically has a number average molecular weight, for example, in the range of 20,000 to 500,000 and alternately in the range of about 100,000 to about 400,000. Butyl rubbers may be produced, for example, via a cationic polymerization in a methyl chloride diluent at temperatures less than −90° C. The term "star branched" is a configuration well known to those having skill in such art. Representative star branched butyl rubbers include, for example, SB Butyl 4266 rubber and SB Bromobutyl 6222 rubber from the ExxonMobil Corporation. Other liquid rubber examples, also available from ExxonMobil Corporation, include Butyl rubbers 065, 068, 165, 365, Chlorobutyl rubbers 1066, 1068, Bromobutyl rubbers 2211, 2222, 2235, and Exxpro 3035, 3433 (Exxpro are specialty elastomers derived from a copolymer of isobutylene and para-methylstyrene). The saturated hydrocarbon polymer may suitably include those which contain a polymer having an average number molecular weight of approximately 500 to approximately 500,000 and which are derived from at least one mono-olefin having 4 through 6 carbon atoms. Examples of such polymers are: polybutene obtained from the polymerization of isobutene; polyisobutylene obtained from the polymerization of isobutylene; polypentenes obtained from the polymerization of one or more pentenes; polyhexenes obtained from the polymerization of one or more hexenes; and; polyolefins obtained from the copolymerization of mono-olefins having 4 through 6 carbon atoms. These polyolefins are liquid or liquid-like at room temperature and provide adhesion and sealing properties to the present sealant composition. The above hydrocarbon liquid rubbers typically has a glass transition temperature lower than about −10° C. with great resistance to gas permeation, thus providing an excellent sealant properties in a wide temperature range. Optionally, small amount of curing agent, such as peroxide, amines and sulfur compounds, may be included in the liquid rubber composition. The liquid rubber may be cured to a small extent after applied to a boss/liner interface, by heating or other known cure methods.

The liquid sealant may comprise a polymer resin in a volatile solvent. As a stream of leaking gas moves through or near the liquid sealant at the boss-liner interface, part of the volatile solvent is removed by the gas flow. As a result, the viscosity of the liquid sealant at the leaking location increases, causing the polymer resin to harden and eventually develop enough resistance to block the gas leak. Any polymer resins in a volatile solvent may be used, although elastomeric polymer resin is preferred. The polymer resin may be completely dissolved in the volatile solvent, or be dispersed/emulsified in the volatile solvent. The volatile solvent includes water and other volatile organic solvents. The volatile solvent may be a mixture of several different volatile compounds. The polymer resin may include, for example, a blend of high molecular weight polymer (such as the rubber composition described above, acrylic resins, polyurethane resins, and vinyl resins) and a tackifying agent such as a terpene resin and a rosin ester.

The liquid sealant may comprise a fiber and/or particle suspended in a viscous liquid. The fiber may include short fibers from about 0.01 mm to about 10 mm in length made from one or more fibrous materials such as cellulose, wool, nylon, rayon, hair, wollastonite, rock-wool, glass wool fibers, polyester, polypropylene, polyethylene, polyaramide, fluoropolymers and other materials of like nature. The particle may include particles in any shapes having at least one dimension in the range of about 0.001 mm to about 1 mm. The liquid sealant may include a mixture of fibers/particles having a wide range of shapes and sizes. Flat plate-like particles, such as mica, and rubber particles, for example, may be included in the liquid sealant. The fiber and/or particle may be suspended in a viscous liquid such as propylene glycol, polypropylene glycol; thickened aqueous/organic solvent solutions.

The liquid sealant described above can withstand the repeated cyclic stresses exerted at the boss/liner interface of a pressurized gas storage tank without mechanical or chemical degradation. The liquid sealant is able to flow and to change shape in response to the stresses without being degraded or developing fatigue. Additionally, the liquid sealant exhibits self-sealing characteristic that is not provides by conventional o-ring or adhesives. The liquid sealant is adapted to flow to and fill-in the gaps at the boss/liner interface, sealing existing or any newly developed leaks. Due to its adaptable feature, the liquid sealant can fit with any boss, liner and tank designs. The liquid sealant thus simplifies tank manufacturing process and reduces cost.

(Add any additional conceivable embodiments of liquid tread seal, details and examples if available.)

The above description of embodiments of the invention is merely exemplary in nature and, thus, variations thereof are not to be regarded as a departure from the spirit and scope of the invention.

What is claimed is:

1. A gas storage tank comprising a structural outer layer, an internal liner layer, an annular boss having a flange section extended inside said tank and partially overlapped with a section of said internal liner layer, and a liquid sealant disposed directly between an overlapping portion of said internal liner layer section and said flange section of said annular boss to provide a gas-tight seal, wherein said liquid sealant is adapted to flow under the gas pressure in the tank and seal small gaps between said internal liner layer and said flange section of said annular boss.

2. The gas storage tank as set forth in claim 1, wherein said internal liner layer comprises polyethylene or aluminum, and said structural outer layer comprises one or more fibers and a fiber reinforcing resin composite.

3. The gas storage tank as set forth in claim 2, wherein said internal liner layer comprises a high density polyethylene and said one or more fibers comprises a continuous filament of carbon or glass fiber and said resin comprises an epoxy resin.

4. The gas storage tank as set forth in claim 1, wherein said internal liner layer has a Young's modulus between 0.2 and 2 giga-Pascal and said annular boss comprises aluminum or an aluminum alloy.

5. A gas storage tank comprising a structural outer layer, an internal liner layer, an annular boss having a flange section extended inside said tank and partially overlapped with a section of said internal liner layer, and a liquid sealant disposed directly between an overlapping portion of said internal liner layer section and said flange section of said annular boss to provide a gas-tight seal, wherein said liquid sealant is adapted to flow under the gas pressure in the tank and seal small gaps between said internal liner layer and said flange section of said annular boss, wherein said liquid sealant comprises a polymer resin and a volatile solvent, and said polymer resin is capable of thickening, hardening and sealing small gaps between said internal liner layer and said flange section of said annular boss when said volatile solvent evaporates due to gas leaks through said small gaps.

6. A gas storage tank comprising a structural outer layer, an internal liner layer, an annular boss having a flange section extended inside said tank and partially overlapped with a section of said internal liner layer, and a liquid sealant disposed directly between an overlapping portion of said internal liner layer section and said flange section of said annular boss to provide a gas-tight seal, wherein said liquid sealant is adapted to flow under the gas pressure in the tank and seal small gaps between said internal liner layer and said flange section of said annular boss, wherein said liquid sealant comprises at least one of fibers and particles suspended in a viscous liquid.

7. The gas storage tank as set forth in claim 6, wherein said fibers or particles have a dimension of 0.01 mm or greater.

8. The gas storage tank as set forth in claim 6, wherein said particles are inorganic particles or rubber particles.

9. A gas storage tank comprising a structural outer layer, an internal liner layer, an annular boss having a flange section extended inside said tank and partially overlapped with a section of said internal liner layer, and a liquid sealant disposed directly between an overlapping portion of said internal liner layer section and said flange section of said annular boss to provide a gas-tight seal, wherein said liquid sealant is adapted to flow under the gas pressure in the tank and seal small gaps between said internal liner layer and said flange section of said annular boss, wherein said liquid sealant comprises a liquid rubber having an ASTM D1646 Mooney viscosity of 30 to about 100 measured at 100° C.

10. The gas storage tank as set forth in claim 9, wherein said liquid sealant comprises a diene liquid rubber or a saturated hydrocarbon rubber.

11. The gas storage tank as set forth in claim 9, wherein said liquid rubber comprises at least one of polyisoprene, polybutadiene, styrene/isoprene/butadiene terpolymers, hydrogenated polybutadiene, styrene-butadiene copolymer, polychloroprene (neoprene), acrylonitrile-butadiene copolymer, ethylene-propylene-diene ter polymer (EPDM), ethylene-propylene copolymers, isobutylene based elastomers, halogenated butyle rubbers, brominated isobutylene-co-para-methylstyrene polymer and their derivatives.

12. A gas storage tank comprising a structural outer layer, an internal liner layer, an annular boss having a flange section extended inside said tank and partially overlapped with a section of said internal liner layer, and a liquid sealant disposed directly between an overlapping portion of said internal liner layer section and said flange section of said annular boss to provide a gas-tight seal, wherein the liquid sealant is adapted to flow to and fill-in gaps between the flange section of the annular boss and the internal liner layer, sealing existing or newly developed leaks.

\* \* \* \* \*